No. 865,449. PATENTED SEPT. 10, 1907.
T. L. & T. J. STURTEVANT.
CLUTCH DEVICE POWER TRANSMITTING MECHANISM.
APPLICATION FILED JAN. 21, 1907.
6 SHEETS—SHEET 4.
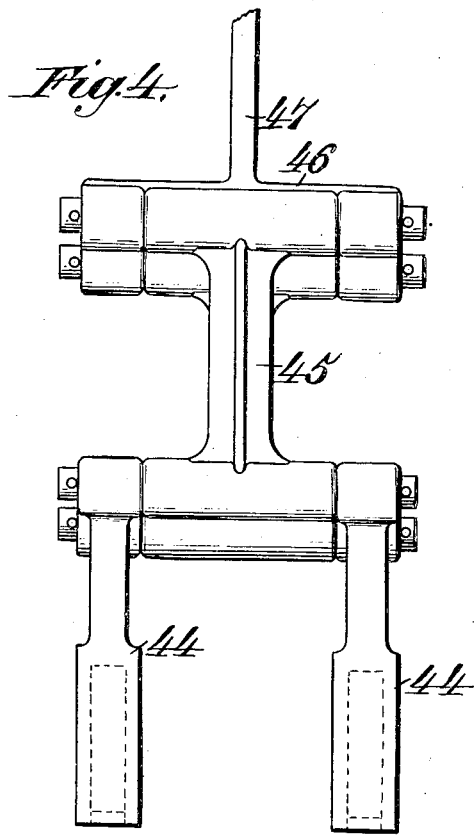
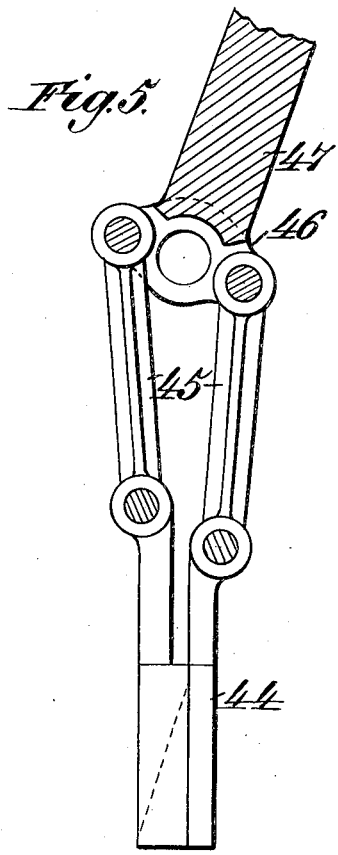
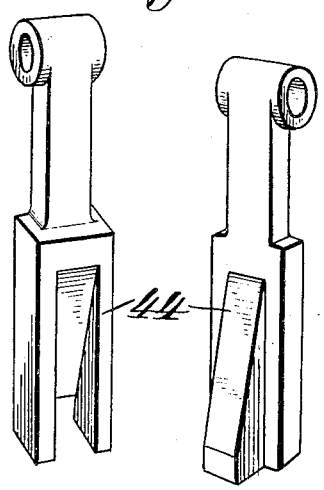
Witnesses.
Robert Everitt.
Arthur W. Calvert.
Inventors:
Thomas L. Sturtevant,
Thomas J. Sturtevant,
by Henry Calvert
Atty.

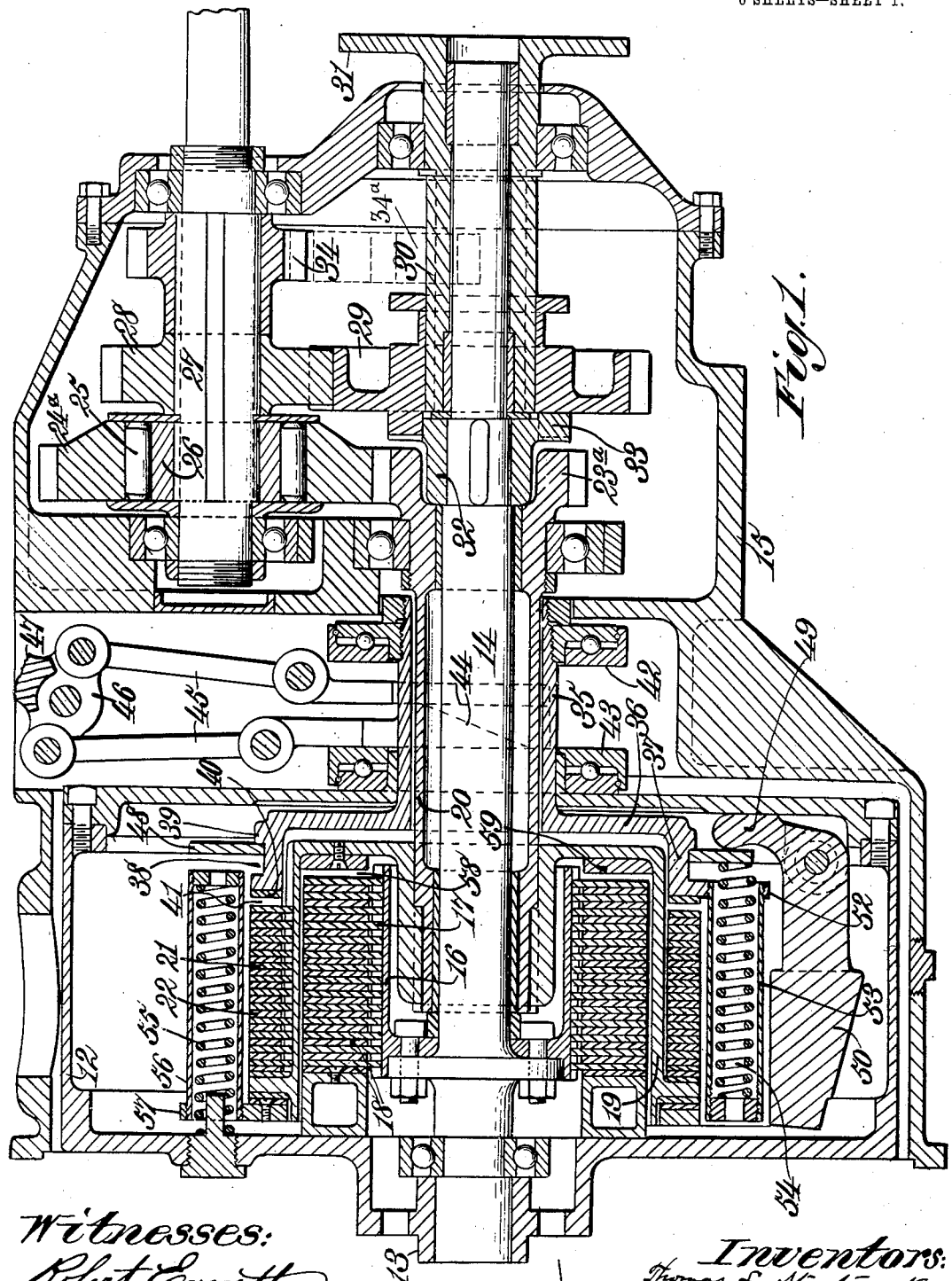

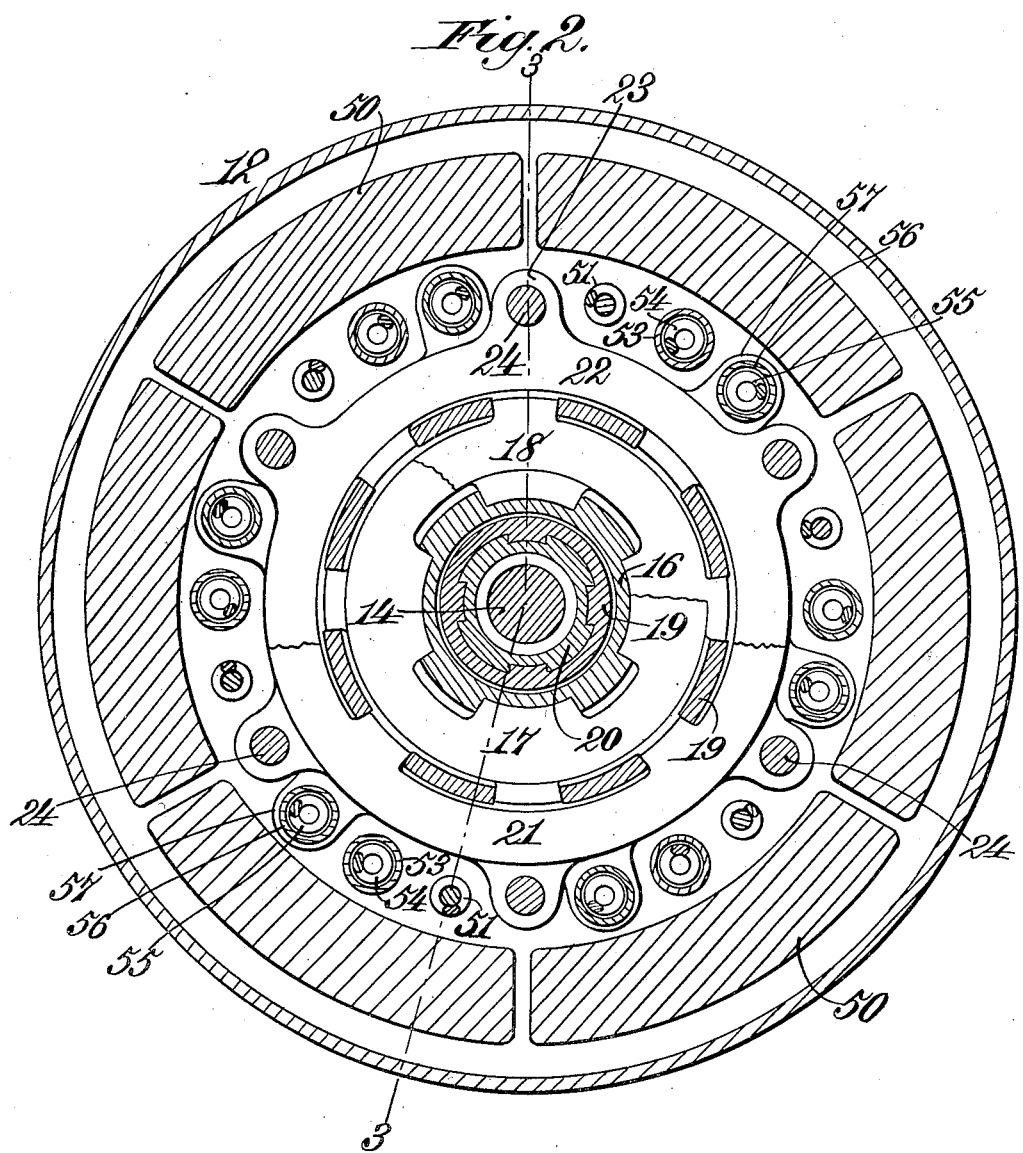

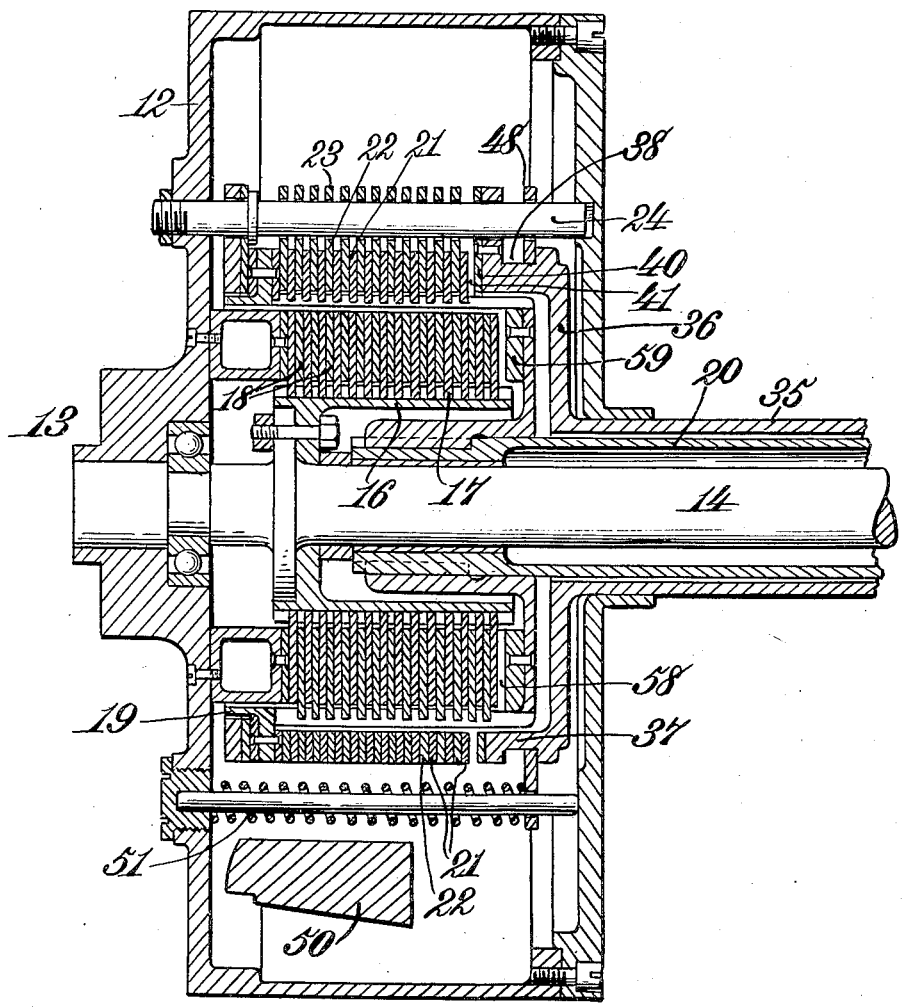

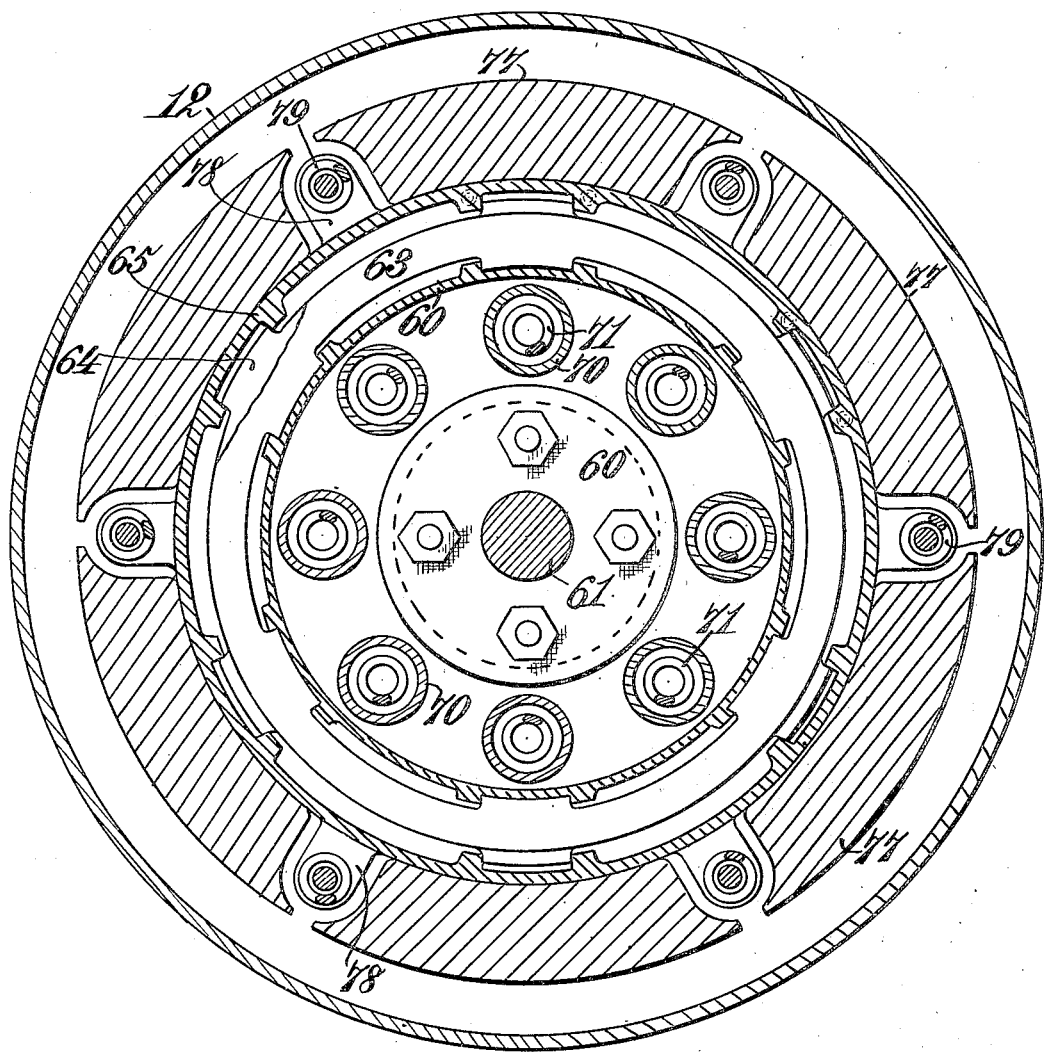

No. 865,449. PATENTED SEPT. 10, 1907.
T. L. & T. J. STURTEVANT.
CLUTCH DEVICE POWER TRANSMITTING MECHANISM.
APPLICATION FILED JAN. 21, 1907.
6 SHEETS—SHEET 6.
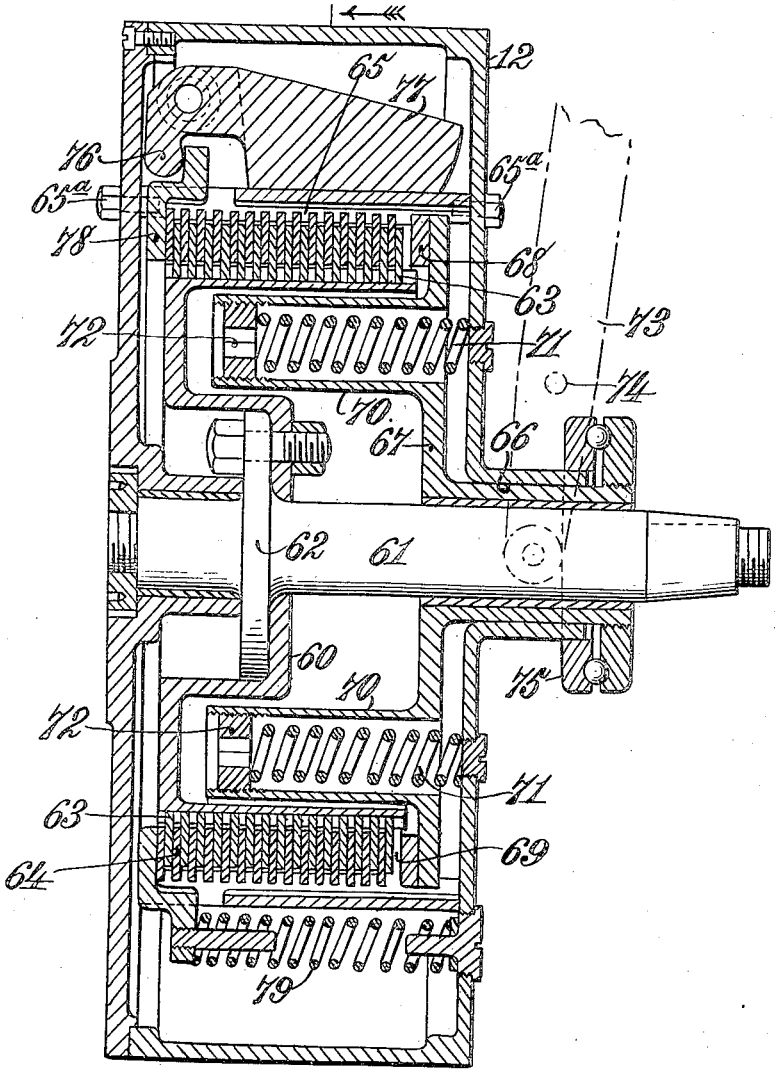

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

CLUTCH-DEVICE POWER-TRANSMITTING MECHANISM.

No. 865,449.  Specification of Letters Patent.  Patented Sept. 10, 1907.

Application filed January 21, 1907. Serial No. 353,338.

*To all whom it may concern:*

Be it known that we, THOMAS LEGGETT STURTEVANT and THOMAS JOSEPH STURTEVANT, both citizens of the United States, residing, respectively, at Quincy and Wellesley, in the county of Norfolk and State of Massachusetts, have invented or discovered certain new and useful Improvements in Clutch-Device Power-Transmitting Mechanisms, of which the following is a specification, reference being had therein to the accompanying drawings.

This invention relates to automatic-clutch, power-transmitting devices more particularly adapted for use with motor-vehicles, but which may be used for other purposes, if desired; the invention having for its principal object to provide an automatic clutch-device with manually controlled means whereby, when necessary, the clutch may be prevented from being set automatically, and also preferably whereby, when desired, the clutch may be set manually, if it should be found necessary or desirable to cause the engagement of the clutching parts at lower or different rotative speeds than those at which it is intended that the clutching parts are to be engaged automatically.

In the accompanying drawings, Figure 1 is a longitudinal section of a clutch device power transmitting mechanism embodying one form of the invention. Fig. 2 is a transverse section, partly broken out at different planes, through the fly-wheel clutch device. Fig. 3 is a longitudinal section through the fly-wheel clutch device on line 3—3, Fig. 2. Figs. 4, 5 and 6 are detail views of the manual controlling device. Fig. 8 is a diametric section of another form of the invention, and Fig. 7 a transverse section of the same, on line 7—7, Fig. 8.

Referring to the drawings, 12 denotes a hollow fly-wheel which will be suitably connected at its hub 13 with an engine or other suitable source of power by which it may be driven, the chamber of said fly-wheel being tightly inclosed so as to be adapted to contain a liquid lubricant. The fly-wheel 12 normally runs loose on a power transmitting shaft 14 suitably supported in a gear box 15. Connected with the shaft 14, to rotate therewith, is a sleeve hub 16 surrounding which is a series of high-speed clutch disks or rings 17, having notched engagements at their inner parts with said sleeve hub, said clutch disks or rings alternating with other high-speed clutch disks or rings 18 having suitable notched engagements at their outer parts with a low-speed driving wheel or spider 19 the hub or central part of which is engaged with a sleeve 20, to rotate therewith, but which wheel or spider is mounted on said sleeve so as to be adapted to have a limited endwise sliding movement thereon. Surrounding the driving wheel or spider 19, and having notched engagements therewith at their inner parts, is a series of low-speed clutch-disks or rings 21 alternating with other low-speed clutch rings or disks 22 having peripheral ears 23 through which pass bolts 24 connecting them to the fly-wheel 12.

The sleeve 20 carries a pinion 23ª meshing with a gear-ring 24ª connected by grip rollers 25 forming a silent ratchet or clutch connection with a hub 26 fast on the counter-shaft 27. The shaft 27 carries a gear 28 meshing with a gear 29 mounted on and having a splined connection with a driving sleeve 30 having at its outer end a flange or disk 31 from which power may be taken. Keyed to the power-transmitting shaft 14 is a hub 32 carrying teeth or projections forming members of a grab-clutch 33 the other teeth or members of which are formed on the gear 29; and thus the said gear 29 and the driving sleeve 30 may be driven directly from the shaft 14 when the high-speed clutch is in operation, and at which time the low-speed gear ring 24ª can overrun, said overrunning operation being the same as that fully described in our U. S. Patent No. 766,552. The gear 29 is adapted to be shifted endwise on the sleeve 30, for the reverse drive, so as to be brought into driving connection with a gear 34 through an idle gear, 34ª, indicated by dotted lines, as is common in motor-vehicle gearing mechanism.

Loosely surrounding the low-speed driving sleeve 20 is a sleeve 35 forming part of a manual controlling device. The sleeve 35 carries, within the fly-wheel 12, a wheel 36 having a horizontal flange 37 provided at its periphery with an annular notch 38 and an annular rib 39. At the inner end of said flange 37 is an abutment ring 40 between which and the adjacent clutch ring or disk 21 is a suitable clearance space 41, when the parts are out of clutching engagement. The sleeve 35 is provided with a thrust-collar or flange 42 suitably secured thereto and between which and an abutment part or collar 43 are arranged wedges 44 the shanks of which are connected by links 45 with the arms of a tilting-lever or walking-beam 46 provided with an operating lever or arm 47 which may be extended to form a suitable handle to be within reach of the driver, or which may be connected with a suitable pedal to be operated by the foot of the driver.

Seated in the annular recess 38 of the flange 37 connected with the controlling sleeve 35, is a ring or annular master-plate 48 against the outer side of which the toes 49 of the centrifugal weights 50 impinge, so that when the said weights are thrown out by centrifugal force the said master-plate or ring will be moved to the left, Fig. 1. The centrifugal weights 50 are normally held inward, or in their inoperative positions, by the stress of springs 51 bearing against the master-plate or ring 48 and preferably interposed between said master-plate or ring and the opposite inner wall of the fly-wheel 12.

The horizontal flange 37 has at its inner end peripheral projections 52 to which are screwed or otherwise suitably attached casings 53 inclosing what are termed safety relief springs 54 the inner ends of which impinge against the master plate or ring 48. The said springs 54 are sufficiently stiff so that when the master-plate is forced to the left, Fig. 1, by the toes of the centrifugal weights, it will also, through the said springs 54, carry the parts 37, 36 and 35 to the left, and thereby close up the clearance between the ring 40 and the adjacent clutch ring 22, thus forcing the low-speed clutch rings or disks into frictional driving engagement with each other, and causing the rotative movement of the fly-wheel to be imparted to the low-speed driving wheel or spider 19 to set the low-speed gearing train into operation. A still further inward movement of the master-plate or disk 48, by the toes of the centrifugal weights 50, as the said weights are thrown further outward centrifugally by a higher rotative speed of the fly-wheel, will cause the entire series of low-speed clutch disks to be moved further to the left, Fig. 1, against the stress of the springs 55 preferably inclosed within casings 56 attached to a ring 57 having a limited sliding movement on the driving wheel 19. When the said driving wheel is moved far enough to the left to close the clearance 58 which normally exists between the contact ring 59, carried by said driving wheel, and the adjacent high-speed clutch disk or ring 17, the high-speed clutch disks or rings will be forced into clutching engagement with each other and the rotative movement of the fly-wheel will then be transmitted directly to the hub 16 secured to the shaft 14, and thus the said shaft and the driving sleeve 30 connected therewith will receive the full rotative speed of the fly-wheel through the low-speed clutch device connected with the said fly-wheel.

It will thus be understood that the high-speed clutch device is driven from the low-speed clutch device, and within which latter the high-speed clutch device is nested in the fly-wheel, thereby permitting the use of a large number of clutch disks or rings, to provide strong clutching devices within a comparatively small space, contributing to compactness of construction.

As hereinbefore stated, the invention has for its object to provide a manually-controlled automatic clutch device, so that the clutching parts may be held out of engagement, when desired, when the driving part or fly-wheel, or the engine with which said driving part or fly-wheel is so connected as to run therewith, may be running at speeds which would otherwise cause the clutching parts to be automatically engaged; as also preferably to provide manually controlled means whereby the clutching parts may be engaged at speeds lower than those at which they would be automatically thrown into engagement by the rotation of the driving part. An embodiment of the invention in its simplest form is shown in Figs. 7 and 8 in which the fly-wheel 12 is shown as being provided with a single-speed clutch device. In this form of the invention a driving wheel 60 is rigidly attached to the power-transmitting or driven shaft 61, said shaft being preferably provided with a flange 62 to which said driving wheel is secured. Surrounding the said driving wheel 60, and having notched engagements therewith at their inner parts, is a series of clutch disks or rings 63 alternating with other clutch disks or rings 64 engaging a ring or shell 65 secured to the fly-wheel casing by bolts 65" passing through the fly-wheel; or the said clutch disks or rings 64 may be otherwise connected with said fly-wheel to rotate therewith.

Suitably mounted for endwise sliding movement relative to the shaft 61 is a sleeve 66 having a wheel 67 disposed within the fly-wheel 12 and provided with an annular master-plate or ring 68 between which and the nearest adjacent clutch disks or rings 63, when the clutching parts are disengaged and the shaft 61 is at rest, is a suitable clearance 69. The wheel 67, which may be termed a controlling wheel, is provided with suitable sleeves or housings 70 within which are arranged springs 71 pressing against the inner wall of the fly-wheel and suitable stops 72 in the said sleeves or housings, so that said springs have a tendency to force the controlling wheel 67 to the left, Fig. 8. This tendency is, however, resisted by a controlling fork or lever 73 pivoted at 74 and engaging at its inner end a collar 75 so connected with the sleeve 66 of the controlling-wheel 67 that it is movable with said sleeve. Suitable means will, of course, be provided to retain the controlling lever in any desired position, while at the same time permitting it to be moved by the driver or attendant to different positions. Thus if the said controlling lever be held in the position shown in Fig. 8 a suitable rotative speed of the fly-wheel will cause the toes 76 of the centrifugal weights 77 to force the master-plate 78 inward against the stress of the relief springs 79, and thereby move the clutch disks or rings to the right, Fig. 8, so as to close the clearance 69 and thus force the clutch disks or rings into frictional engagement with each other to set the power-transmitting shaft 61 in motion through the driving wheel 60. If, however, it be desired to prevent the clutch from being set into clutching operation at such rotative speed of the fly-wheel as will throw the free ends of the centrifugal weights fully outward into contact with stops on the inner wall of the fly-wheel, the controlling lever 73 may be manually operated to force the controlling wheel 67 to the right, Fig. 8, far enough to afford such a wide clearance at 69 as will not be closed by the full movement of the master-plate 78 under the influence of the said centrifugal weights; and thus however high the speed of rotation of the fly wheel may be the clutching operation of the clutch device will be prevented. If it be desired to throw the clutch into operation at rotative speeds lower than those which would normally effect the clutching operation automatically the controlling lever 73 will be so placed or moved as to permit the springs 71 to force the controlling wheel 67 to the left far enough to close the clearance 69 and thus cause the master-plate 68 carried by said wheel to force the clutching disks into frictional engagement with each other and thereby set the shaft 61 into rotation.

It will thus be understood that in the construction afforded by the invention the automatically acting or centrifugal clutch device is supplemented by manually operated controlling means by which the attendant or driver may at any time, or at any running speed of the driving part, throw the normally automatically-operating clutch-device into or out of clutching action;

the controlling lever 73 being, of course, suitably arranged or connected either for hand or foot operation.

We do not herein broadly claim the manually-controlled automatic clutch mechanism herein described independently of the speed-changing gearing mechanism, said manually-controlled clutch mechanism, broadly, being claimed in our application No. 365,055, filed March 28, 1907, as a division of this application.

While the invention, in its preferred form, includes multiple disks as the clutching elements of the clutch device or devices, and while centrifugally acting automatic means for effecting the clutching engagement of the clutch members will preferably be utilized, it will be understood that other forms of clutching devices than those of the multiple-disk type may be employed; and that other automatic means than centrifugally acting means may be utilized, without departing from the essence or scope of the invention as summarized in the appended claims.

Having thus described our invention we claim and desire to secure by Letters Patent:

1. In a power transmitting mechanism, the combination with a driving and driven part, of a plurality of nested clutch devices, and suitable gearing connections whereby different speeds may be imparted to the said driven part from the said driving part through said clutch devices.

2. In a power-transmitting mechanism, the combination with a driving and driven part, of a plurality of nested, multiple-disk clutch devices, and suitable gearing connections whereby different speeds may be imparted to the said driven part from the said driving part through said clutch devices.

3. In a power-transmitting mechanism, the combination with a driving and driven part, of a plurality of nested automatic clutch devices, and suitable gearing connections whereby different speeds may be imparted to the said driven part from the said driving part through said clutch devices.

4. In a power-transmitting mechanism, the combination with a driving and driven part, of a plurality of nested, centrifugally-engaged clutch devices, and suitable gearing connections whereby different speeds may be imparted to the said driven part from the said driving part through said clutch devices.

5. In a power-transmitting mechanism, the combination with a fly-wheel, of a plurality of clutch devices, inclosed within said fly-wheel and one nested within the clutch circle of the other, of a driven part, and gearing connections between said clutch devices and said driven part whereby different speeds may be imparted to the latter from the said fly-wheel through said clutch devices.

6. In a power-transmitting mechanism, the combination with a fly-wheel, of a plurality of multiple-disk clutch devices inclosed within said fly wheel and one nested within the clutch circle of the other, of a driven part, and gearing connections between said clutch devices and said driven part whereby different speeds may be imparted to the latter from the said fly-wheel.

7. In a power transmitting mechanism, the combination with a fly-wheel, of a plurality of automatic clutch devices inclosed within said fly-wheel and one nested within the clutch circle of the other, of a driven part, and connections between said clutch devices and said driven part whereby different speeds may be imparted to the latter from the said fly-wheel.

8. In a power-transmitting mechanism, the combination with a fly-wheel, of a plurality of centrifugally engaged clutch devices inclosed within said fly wheel and one nested within the clutch circle of the other, of a driven part, and connections between said clutch devices and said driven part whereby different speeds may be imparted to the latter from the said fly-wheel.

9. In a power-transmitting mechanism, the combination with a driving and driven part and suitable gearing, of normally disconnected friction clutch mechanism, automatic means whereby the members of said mechanism are forced in frictional engagement with each other and whereby also speed changes are automatically effected, and a manual controlling device for the automatic clutch mechanism.

10. In a power transmitting mechanism, the combination with a driving and driven part and suitable gearing, of automatic, multiple-disk, speed-changing clutch devices, and a manual controlling device for said automatic clutch devices.

11. In a power-transmitting mechanism, the combination with a driving and driven part and suitable gearing, of normally disconnected friction clutch mechanism, centrifugally-acting means whereby the clutching members of said mechanism are automatically forced into frictional clutching engagement with each other and whereby also speed changes are automatically effected, and a manual controlling device for the centrifugally-engaged clutch mechanism.

12. In a power transmitting mechanism, the combination with a driving and driven part and suitable gearing, of high and low speed clutch devices, one nested within and being driven by the other.

13. In a power transmitting mechanism, the combination with driving and driven parts and suitable gearing, of high and low speed, multiple-disk clutch devices, one nested within and being driven by the other.

14. In a power transmitting mechanism, the combination with driving and driven parts and suitable gearing, of high and low speed clutch devices, one nested within and being driven by the other, and manual controlling devices for the said clutch devices.

15. In a power-transmitting mechanism, the combination with a driving and driven part and suitable gearing, of high and low speed friction clutch devices normally disconnected from each other, automatic means for forcing the clutching parts thereof into frictional engagement with each other, and a manual controlling device whereby the automatic clutch action may be prevented when desired.

16. In a power-transmitting mechanism, the combination with a driving and driven part and suitable gearing, of high and low speed, multiple-disk clutch devices, automatic means for forcing the parts thereof into clutching engagement, and a manual controlling device whereby the automatic clutch action may be prevented when desired.

17. In a power transmitting mechanism, the combination with a driving and a driven part and a suitable gearing, of normally disconnected high and low speed friction clutch devices, centrifugally acting means for forcing the clutching parts thereof into frictional engagement with each other, and a manual controlling device whereby the automatic clutch action may be prevented when desired.

18. In a power-transmitting mechanism, adapted to be used in vehicles, the combination with a driving part, a gear-box, and gearing within said gear-box, of an automatic clutch device located between said driving part and said gear-box, and a manual controlling device for said automatic clutch device.

19. In a power-transmitting mechanism, adapted to be used in vehicles, the combination with a driving part, a gear-box and gearing within said gear-box, of an automatic clutch device located between said driving part and said gear-box, a fly-wheel within which the parts of said automatic clutch device are housed, and a manual controlling device for said automatic clutch device.

20. In a power-transmitting mechanism adapted to be used in vehicles, the combination with a driving part, a gear-box, and gearing within said gear-box, of a multiple-disk, automatic clutch device located between said driving part and said gear-box, and a manual controlling device for said automatic clutch device.

21. In a power-transmitting mechanism adapted to be used in vehicles, the combination with a driving part, a gear-box, and gearing within said gear-box, of a multiple disk, automatic clutch device located between said driving part and said gear-box, a fly-wheel within which the parts of said automatic clutch device are housed, and a manual controlling device for said automatic clutch device.

22. In a power-transmitting mechanism adapted to be used in vehicles, the combination with a driving part, a gear-box, and gearing within said gear-box, of a centrifugally-controlled, friction clutch device located between said driving part and said gear-box, and a manual controlling device whereby the automatic clutching action of said clutch device may be prevented, when desired.

23. In a power-transmitting mechanism adapted to be used in vehicles, the combination with a driving part, a gear-box, and gearing within said gear-box, of a multiple-disk, centrifugally-controlled, friction clutch device located between said driving part and said gear-box, and a manual controlling device whereby the automatic clutching action of said clutch device may be prevented, when desired.

24. In a power-transmitting mechanism adapted to be used in vehicles, the combination with a driving part, a gear-box, and gearing within said gear-box, of a centrifugally-controlled, friction clutch device located between said driving part and said gear-box, a fly-wheel within which all of the parts of said centrifugally-controlled clutch device are housed, and a manual controlling device whereby the automatic clutching action of said clutch device may be prevented, when desired.

25. In a power-transmitting mechanism adapted to be used in vehicles, the combination with a driving part, a gear-box, and gearing within said gear-box, of a multiple-disk, centrifugally-controlled, friction clutch device located between said driving part and said gear-box, a fly-wheel within which all of the parts of said centrifugally controlled clutch device are housed, and a manual controlling device whereby the automatic clutching action of said clutch device may be prevented, when desired.

In testimony whereof we affix our signatures, in presence of two witnesses.

THOMAS LEGGETT STURTEVANT.
THOMAS JOSEPH STURTEVANT.

Witnesses:
L. H. STURTEVANT,
W. F. ELLES.